United States Patent [19]
Park

[11] Patent Number: 5,944,136
[45] Date of Patent: Aug. 31, 1999

[54] TRANSFER SHAFT FOR AN AUTOMATIC TRANSMISSION

[76] Inventor: Dong Hoon Park, 101-801, Bowon Apt., Pungdukchun-lee 692, Sugi-myun, Kyungki-do, Rep. of Korea

[21] Appl. No.: 08/856,577

[22] Filed: May 15, 1997

[30] Foreign Application Priority Data

May 15, 1996 [KR] Rep. of Korea ....................... 96-16161

[51] Int. Cl.⁶ ................................................. B60K 17/24
[52] U.S. Cl. ........................................... 180/381; 180/379
[58] Field of Search .................................... 180/381, 379, 180/337, 343, 344, 376; 464/180; 74/607

[56] References Cited

U.S. PATENT DOCUMENTS

| | | | |
|---|---|---|---|
| 3,292,369 | 12/1966 | Adloff et al. | 180/381 X |
| 3,848,644 | 11/1974 | Matsai et al. | 180/381 |
| 4,648,415 | 3/1987 | Veglia | 180/297 |
| 5,829,306 | 11/1998 | Komazaki et al. | 74/411 |
| 5,868,517 | 2/1999 | Aoki et al. | 403/359 |

FOREIGN PATENT DOCUMENTS 552671  12/1959  Belgium ............................. 180/381

*Primary Examiner*—Christopher P. Ellis
*Attorney, Agent, or Firm*—Birch, Stewart, Kolasch & Birch, LLP

[57] ABSTRACT

A transfer shaft for an automatic transmission, provided between a transfer idle gear for outputting driving power from the automatic transmission and a differential driven gear for transmitting the driving power to a drive axle thereby transmitting an output of the transmission to the drive axle, comprising a first shock absorbing means which interconnects a transfer driven gear meshed with the transfer idle gear with one side of the transfer shaft, and absorbs shocks transmitted between the transmission and the drive axle, and a second shock absorbing means which interconnects an opposite side of the transfer shaft, in which said first shock absorbing means is disposed, with a differential drive gear for transmitting the driving power to a differential, and absorbs the shocks transmitted between the transmission and the drive axle.

5 Claims, 2 Drawing Sheets

TRANSFER SHAFT FOR AN AUTOMATIC TRANSMISSION

BACKGROUND

The present invention relates to a transfer shaft for an automatic transmission, and in more particularly, to a transfer shaft for an automatic transmission which is provided with a transfer driven gear at one end and a differential drive gear at another end, thereby transmitting output generated from a transmission to a differential to reduce the amount of shift shock transmitted to an axle.

A transfer shaft is a part of the power transmission system of a vehicle. The transfer shaft is mounted between a transfer drive gear and a differential driven gear of an automatic transmission and transmits output shifted from the transmission to an axle through a differential.

As shown in FIG. 2, the transfer shaft 51 is rotatably disposed in a transmission case 53. On one side of the transfer shaft 51, a transfer driven gear 55 for receiving power outputted from the automatic transmission is disposed, and on another side a differential drive gear 57 is disposed, thereby transmitting the output of the transmission.

In the above, the transfer shaft for automatic transmissions is connected with the transfer driven gear for receiving power by a spline and is integrally formed with the differential drive gear for transmitting power to the differential, shift shock is transmitted to a drive axle, or drive shock is generated in the drive axle or received from a road surface, thereby decreasing overall ride comfort.

SUMMARY OF THE INVENTION

Therefore, the present invention has been made in an effort to solve the above problems. The object of the present invention is to provide a transfer shaft for an automatic transmission wherein a transfer driven gear and a differential drive gear are disposed enabling the absorption of shocks, thereby reducing shift shock transmitted to a drive axle and preventing drive shock, generated in the drive axle and received from a road surface, from being transmitted to the transmission such that ride comfort is improved.

To achieve the above object, the present invention provides a transfer shaft for an automatic transmission provided between a transfer idle gear for outputting driving power from the automatic transmission and a differential driven gear for transmitting the driving power to a drive axle thereby transmitting an output of the transmission to the drive axle, comprising a first shock absorbing means which interconnects a transfer driven gear meshed with the transfer idle gear with one side of the transfer shaft, and absorbs shocks transmitted between the transmission and the drive axle, and a second shock absorbing means which interconnects an opposite side of the transfer shaft, in which the first shock absorbing means is disposed, with a differential drive gear for transmitting the driving power to a differential, and absorbs the shocks transmitted between the transmission and the drive axle.

The first shock absorbing means includes a gap, determined by an outer circumference of an inner member and an inner circumference of a coupling groove, in which the inner member projectedly formed in a hub of the transfer drive gear and the coupling groove inwardly formed in one end of the transfer shaft are interconnected, and a torsion member, disposed within the gap, which is fixed to one side of the inner member at one end thereof and to one side of the coupling groove of the transfer shaft at the other end thereof thereby transmitting the driving power from the transfer driven gear to the transfer shaft.

The torsion member is a torsion spring absorbing rotary shocks.

The second shock absorbing means includes an inner spline projectedly formed in a hub of the differential drive gear, an outer spline which is coupled with the inner spline by a constant rotating clearance and is formed inside one end of the transfer shaft, an oil chamber formed by coupling the inner and outer splines, and an oil hole formed in the transfer shaft to supply hydraulic pressure in proportion to input torque of the transmission from an oil conduit formed in a transmission case.

Orifices are formed in the inner and outer splines forming the oil chamber so as to regulate the quantity of the oil supplied to the oil hole in accordance with the amount of shock transmitted between the transmission and the drive axle thereby regulating the amount of shock that is absorbed.

BRIEF DESCRIPTION OF THE DRAWINGS

The accompanying drawings, which are incorporated in and constitute a part of this specification, illustrate an embodiment of the invention and, together with the description, serve to explain the principles of the invention.

DESCRIPTION

Preferred embodiment of the present invention will now be described in detail with reference to the accompanying drawings.

Figure 1:
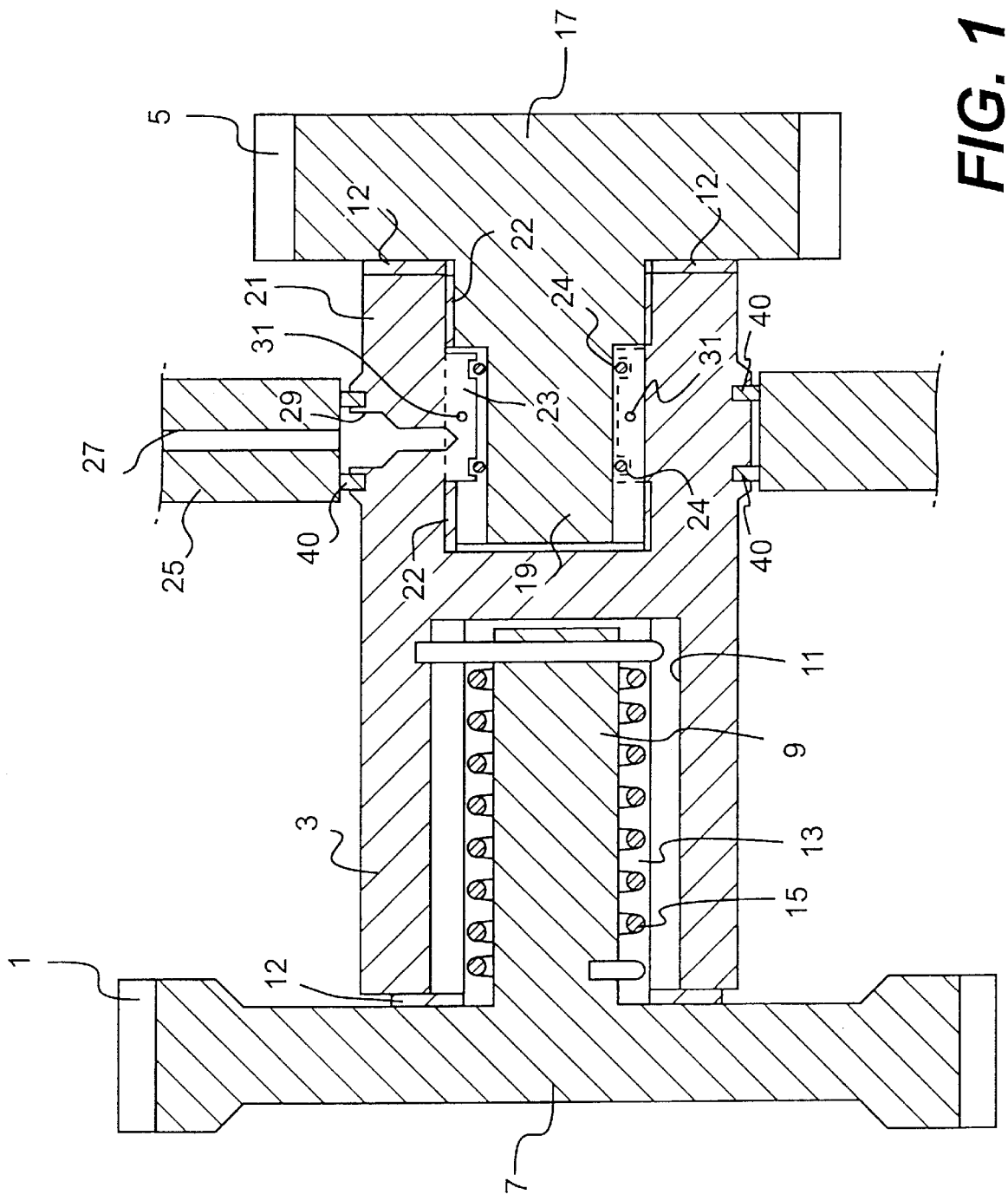
FIG. 1 is a sectional view of a transfer shaft for an automatic transmission in accordance with an embodiment of the present invention.
Figure 2:
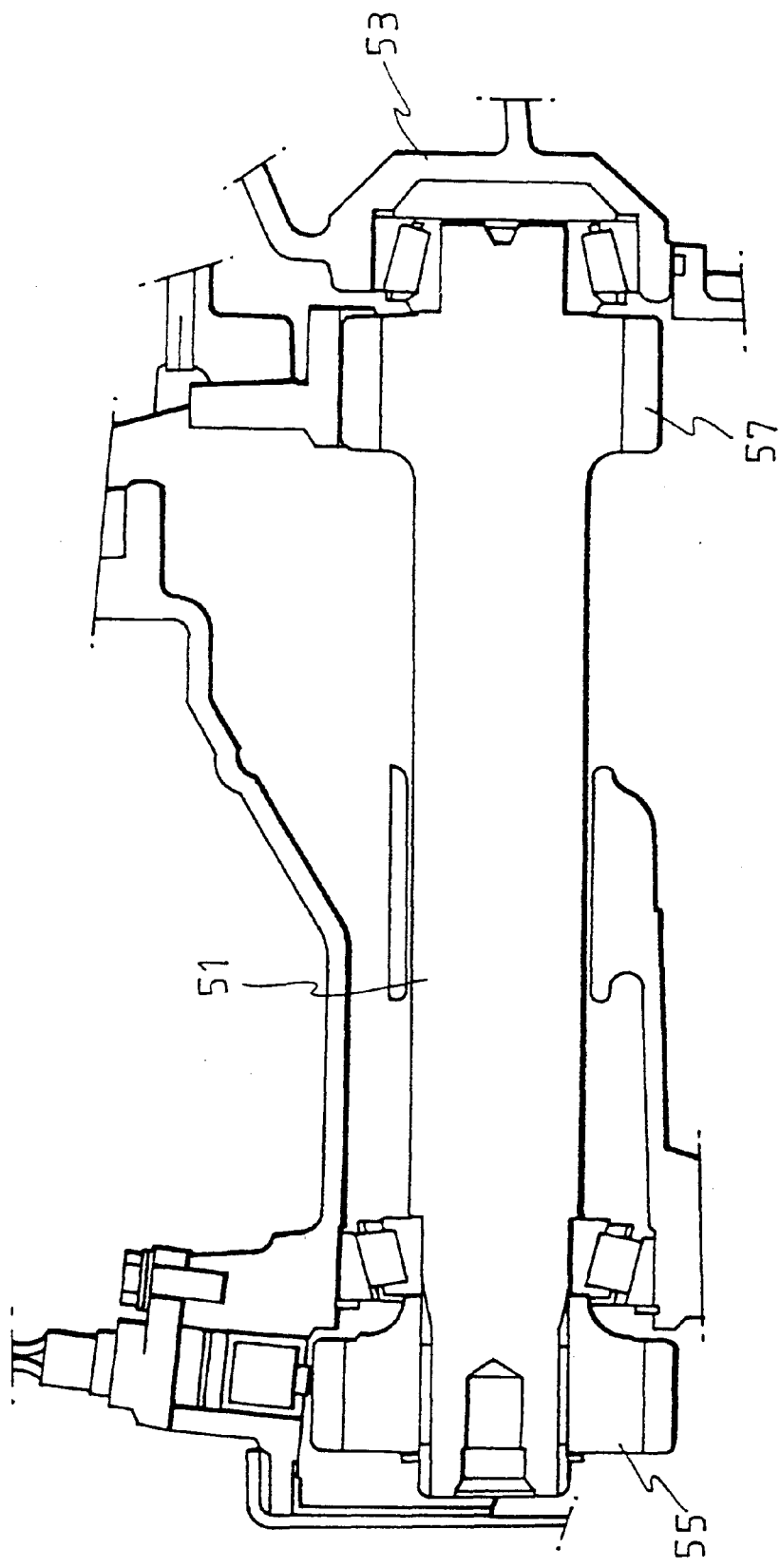
FIG. 2 is a sectional view of a transfer shaft for an automatic transmission of the prior art.

FIG. 1 is a sectional view of a transfer shaft for an automatic transmission in accordance with an embodiment of the present invention. Reference numeral '1' in the drawing indicates a transfer driven gear.

To transmit output of the transmission through its meshing with a transfer idle gear(not shown) which, in turn, is meshed with a transfer drive gear(not shown), the transfer driven gear 1 is disposed in one end of a transfer shaft 3 by interposing a first shock absorbing means.

In another end of the transfer shaft 3, opposite that to which the transfer driven gear 1 is disposed, a differential drive gear 5 is disposed by interposing a second shock absorbing means. The differential drive gear 5 meshes with a transfer driven gear(not shown) thereby transmitting the output of the transmission, transmitted to the transfer shaft 3, to a drive axle.

The above first and second shock absorbing means for disposing the transfer driven gear 1 and the differential drive gear 5 in the transfer shaft 3 function to absorb shift shock and drive shock transmitted between the transmission and the drive axle.

The first shock absorbing means includes an inner member 9 projectedly formed in a hub 7 of the transfer driven gear 1, and a coupling groove 11 formed on one side of the transfer shaft 3 to allow coupling with the inner member 9. Further, there is provided a gap 13 defined by an outer circumference of the inner member 9 and an inner circumference of the coupling groove 11 wherein the coupling groove 11 and the inner member 9 are loosely coupled between the hub 7 of the transfer driven gear 1 and a vertical hem of the transfer shaft 3 by interposing a thrust bearing 12. Also included in the first shock absorbing means is a torsion member 15 disposed within the gap 13.

The thrust bearing 12 is interposed for smoothly supporting the transfer driven gear 1 and the transfer shaft 3 axially, and can be replaced with a washer. Various substitutes can also be used for torsion member 15. In the embodiment of the present invention a torsion spring is disclosed.

The torsion spring 15 is fixed to one side of the inner member 9 at one end thereof and to one side of the coupling groove 11 of the transfer shaft 3 at the other end thereof, whereby it is coiled on an outer circumferential surface of the inner member 9 and released toward the inner circumferential thereby absorbing and dampening relative rotary power between the transfer driven gear 1 and the transfer shaft 3.

The second shock absorbing means interposed on the opposite side of the transfer shaft 3 in which the first shock absorbing means is disposed, includes an inner spline 19 projectedly formed on a hub 17 of the differential drive gear 5, and a outer spline 21 formed in an end of the transfer shaft 3 to be coupled with the inner spline 19.

A bushing 22 to allow for smooth relative rotation between the transfer shaft 3 and the differential drive gear 5 within the limit of rotation of the differential drive gear 5 is interposed between the inner and outer splines 19 and 21 which are coupled to each other through a spline connection. Also, a thrust bearing 12 is interposed on opposite sides of the vertical hem of the transfer shaft 3 and between the hub 17 of the differential drive gear 5.

Further, the second shock absorbing means includes an oil chamber 23 formed loosely coupled to and allowing a fixed amount of free play between the inner and outer splines 19 and 21, and seal rings 24 for sealing oil of the oil chamber 23 and interposed between the inner and outer splines 19 and 21 forming the oil chamber 23.

An oil hole 29, which is connected to an oil conduit 27 formed for supplying hydraulic pressure from a transmission case 25 and receiving the oil, is formed in the outer spline 21. Between the transfer shaft 3 and transmission case 25 where the oil hole 29 is formed, there are provided seal rings 40 for sealing the oil supplied from the oil conduit 27 to the oil hole 29.

The oil supplied to the oil hole 29 is supplied in proportion to the input torque of the transmission to absorb the shock between the inner and outer splines 19 and 21. Also, orifices 31 are formed in the inner and outer splines 19 and 21, the orifices 31 regulating the quantity of oil supplied to the oil hole 29 in accordance with the amount of shock transmitted between the transmission and the drive axle, thereby regulating the amount of shock that is absorbed.

In the transfer shaft for the automatic transmission structured as described above, the output of the transmission is inputted through the transfer driven gear 1, and it is then transmitted to the differential through the transfer shaft 3 and the differential drive gear 5 to finally be transmitted to the drive axle.

As the output of the transmission is transmitted from the transmission to the drive axle, shift shock generated from the transmission is also transmitted as described above. Here, the torsion member 15 of the first shock absorbing means is coiled or released in the gap 13 formed between the inner member 9 and coupling groove 11 thereby firstly absorbing shift shock, and the hydraulic pressure supplied to the oil chamber 23 formed between the inner and outer splines 19 and 21 of the second shock absorbing means passes through the orifice 31 thereby secondly absorbing shift shock.

In addition, drive shock generated from the drive axle is inputted through the differential drive gear and is transmitted to the transmission through the transfer shaft 3 and the transfer driven gear 5. Here, also, the second shock absorbing means firstly absorbs drive shock and the first shock absorbing means secondly absorbs drive shock.

Therefore, shift shock generated from the transmission and drive shock generated by contact between the driving wheels and the road surface are absorbed to improve overall ride comfort.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A transfer shaft for an automatic transmission, provided between a transfer idle gear for outputting driving power from the automatic transmission and a differential driven gear for transmitting the driving power to a drive axle thereby transmitting an output of the transmission to the drive axle, comprising:

a first shock absorbing means which interconnects a transfer driven gear meshed with the transfer idle gear with one side of the transfer shaft, and absorbs shocks transmitted between the transmission and the drive axle; and a second shock absorbing means which interconnects an opposite side of the transfer shaft, in which said first shock absorbing means is disposed, with a differential drive gear for transmitting the driving power to a differential, and absorbs the shocks transmitted between the transmission and the drive axle.

2. A transfer shaft for an automatic transmission as claimed in claim 1, wherein said first shock absorbing means includes:

a gap, determined by an outer circumference of an inner member and an inner circumference of a coupling groove, in which the inner member projectedly formed in a hub of the transfer drive gear and the coupling groove inwardly formed in one end of the transfer shaft are interconnected; and a torsion member, disposed within the gap, which is fixed to one side of the inner member at one end thereof and to one side of the coupling groove of the transfer shaft at the other end thereof thereby transmitting the driving power from the transfer driven gear to the transfer shaft.

3. A transfer shaft for an automatic transmission as claimed in claim 2, wherein said torsion member is a torsion spring absorbing rotary shocks.

4. A transfer shaft for an automatic transmission as claimed in claim 1, wherein said second shock absorbing means includes:
- an inner spline projectedly formed in a hub of the differential drive gear;
- an outer spline which is coupled with the inner spline by a constant rotating clearance and is formed inside one end of the transfer shaft;
- an oil chamber formed by coupling the inner and outer splines; and
- an oil hole formed in the transfer shaft to supply hydraulic pressure in proportion to input torque of the transmission from an oil conduit formed in a transmission case.

5. A transfer shaft for an automatic transmission as claimed in claim 4, wherein orifices are formed in the inner and outer splines forming the oil chamber so as to regulate the quantity of the oil supplied to the oil hole in accordance with the amount of shock transmitted between the transmission and the drive axle thereby regulating the amount of shock that is absorbed.

\* \* \* \* \*